Oct. 10, 1933.  E. A. FERRIS  1,930,004
DOUBLE HOOK POWER DOG
Filed April 22, 1924  5 Sheets-Sheet 1
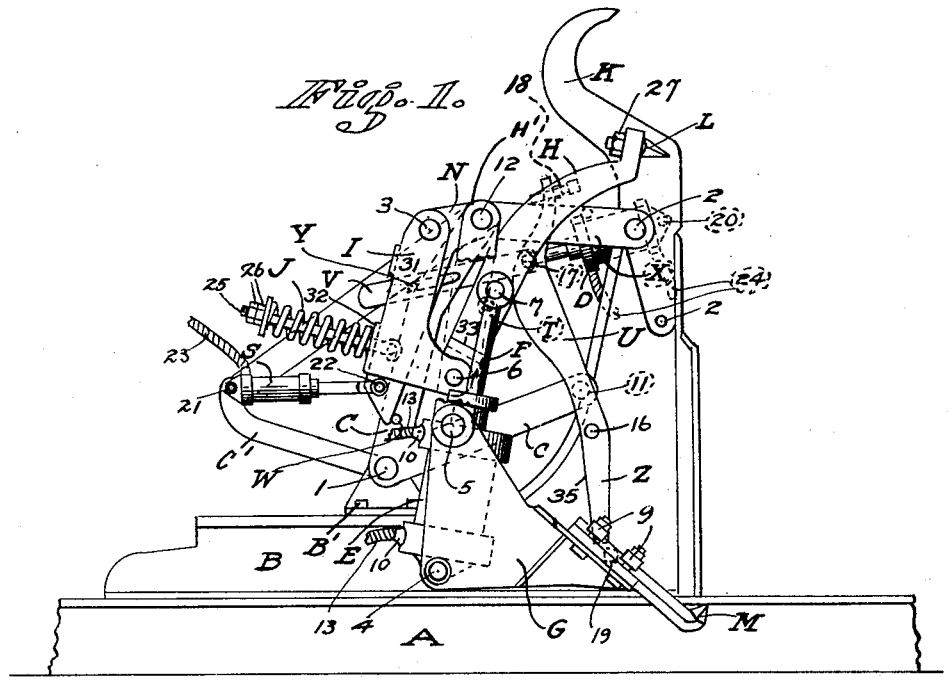
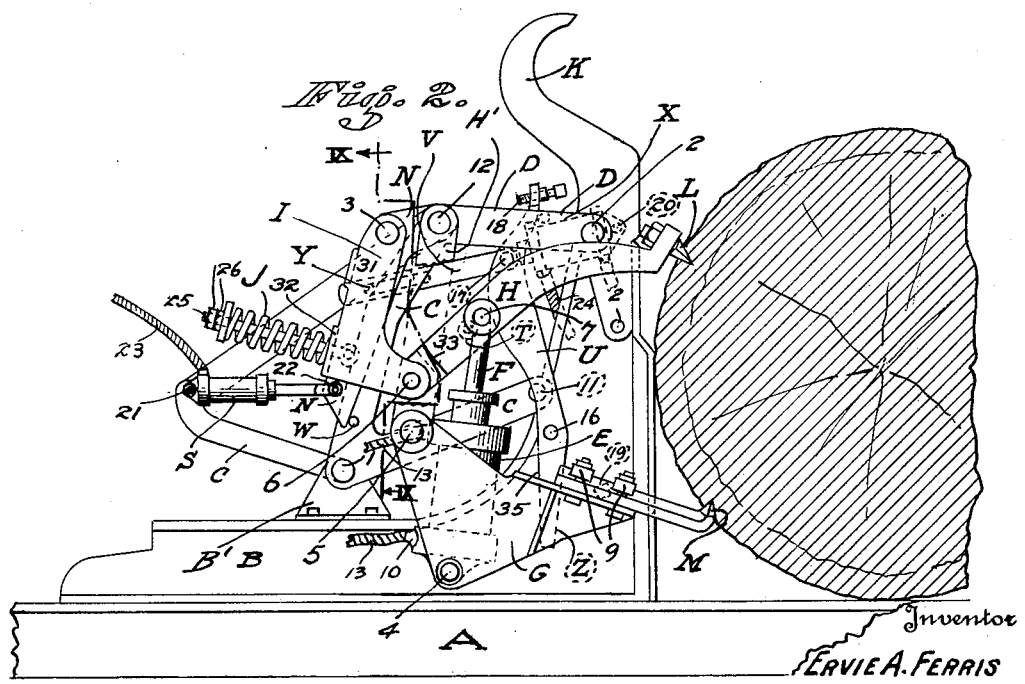
Inventor
ERVIE A. FERRIS Oct. 10, 1933.    E. A. FERRIS    1,930,004
DOUBLE HOOK POWER DOG
Filed April 22, 1924    5 Sheets-Sheet 2
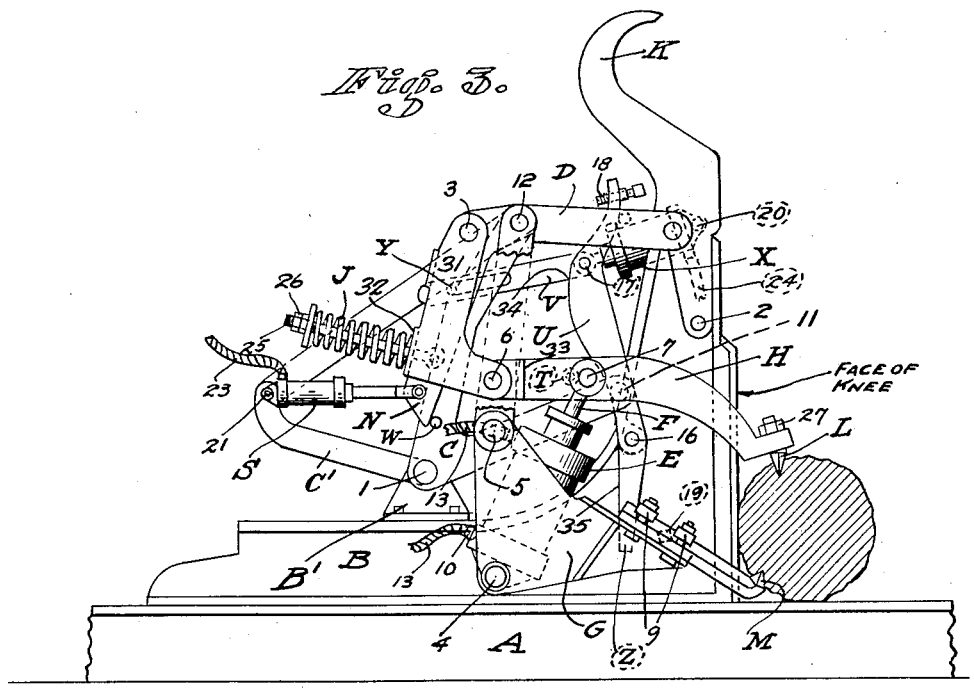
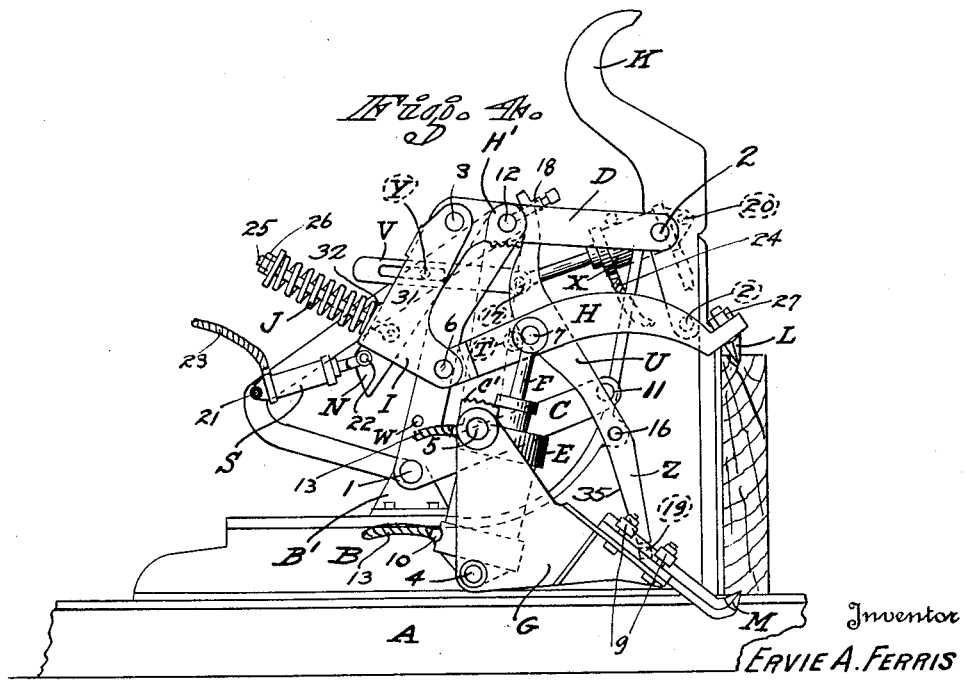
Inventor
ERVIE A. FERRIS

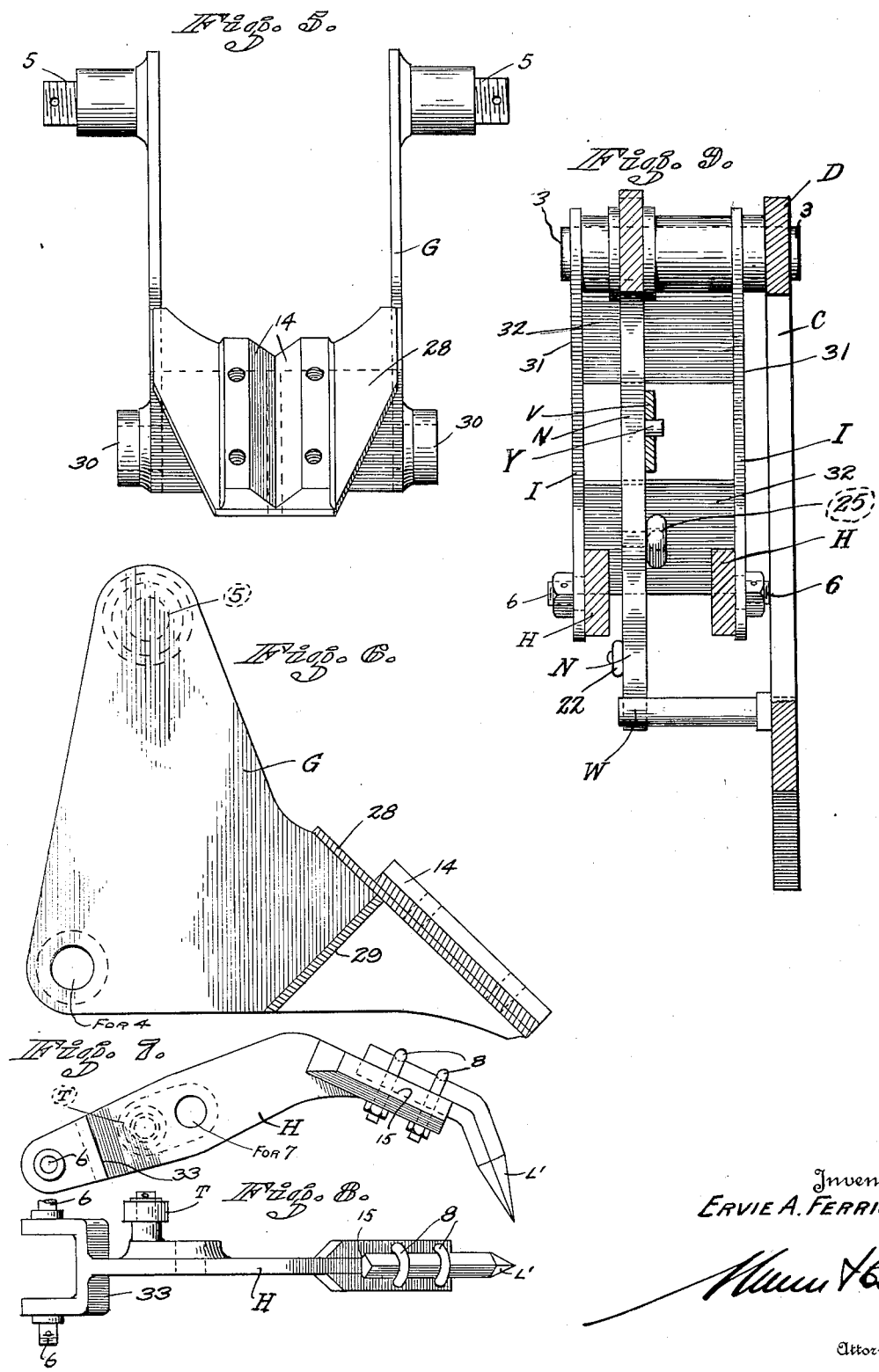

Oct. 10, 1933.  E. A. FERRIS  1,930,004
DOUBLE HOOK POWER DOG
Filed April 22, 1924   5 Sheets-Sheet 4
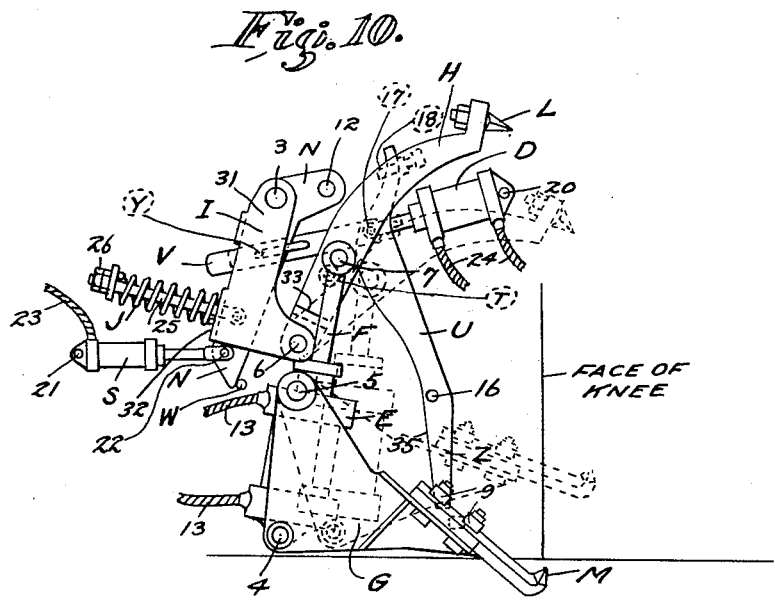
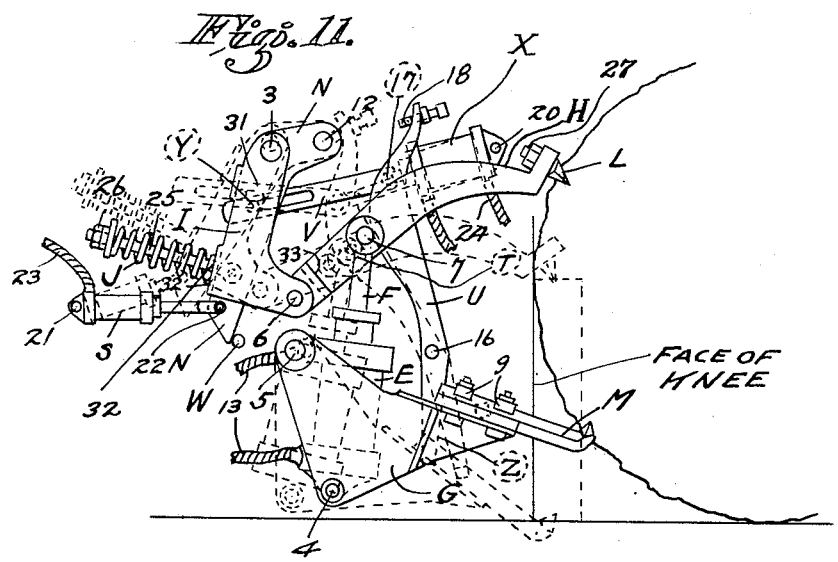
INVENTOR
ERVIE A. FERRIS
BY
ATTORNEYS.

Oct. 10, 1933.  E. A. FERRIS  1,930,004
DOUBLE HOOK POWER DOG
Filed April 22, 1924  5 Sheets-Sheet 5
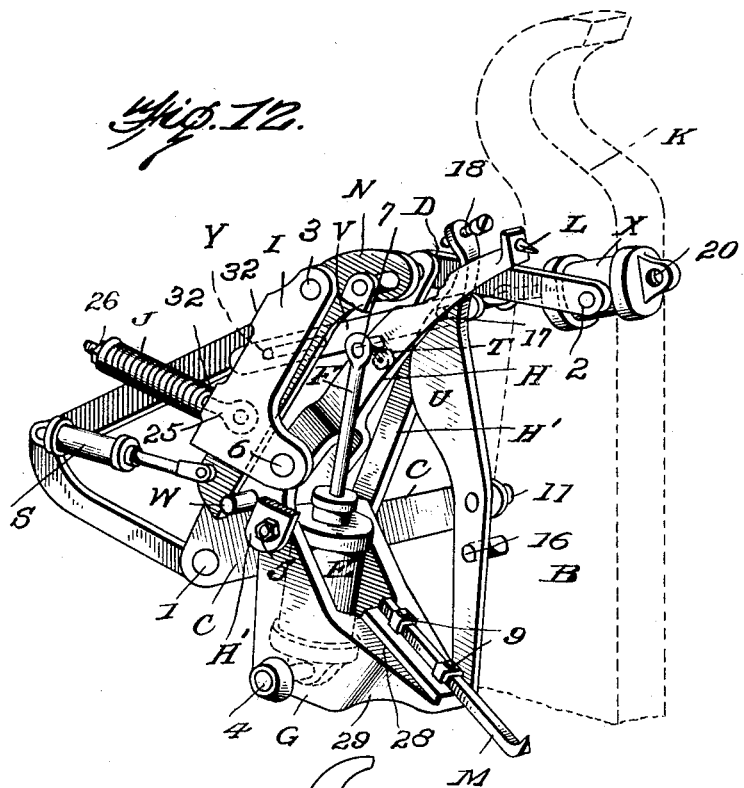
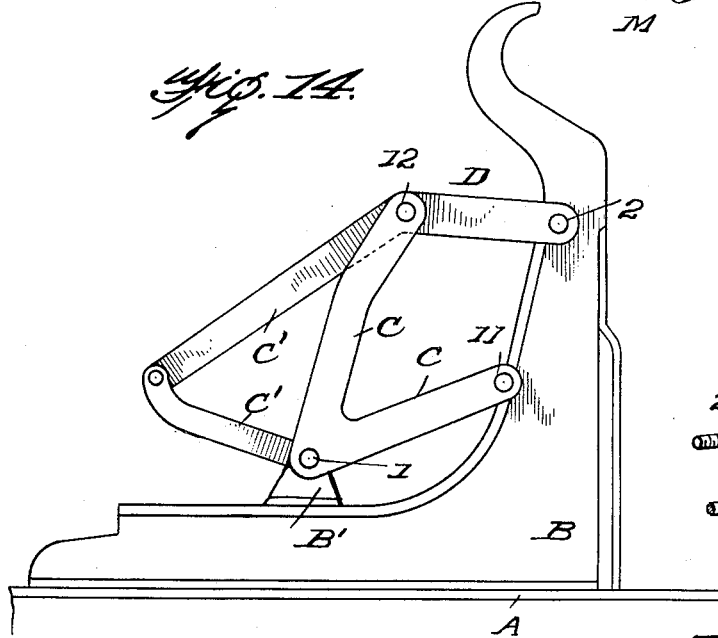
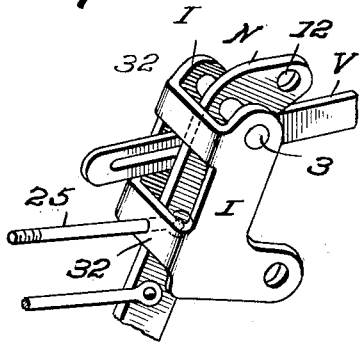
Inventor
ERVIE A. FERRIS,
By
Attorney Patented Oct. 10, 1933

1,930,004

UNITED STATES PATENT OFFICE 1,930,004

DOUBLE HOOK POWER DOG

Ervie A. Ferris, Westwood, Calif., assignor to Martin Air Dog Company, San Francisco, Calif., a corporation of California Application April 22, 1924. Serial No. 708,289

16 Claims. (Cl. 143—125)

This invention is directed to an improvement in power operated dogs for saw mill carriages wherein the dogs, arranged to grip the log or cant from above and beneath are actuated through power mechanism connected to and carried by the dogs.

One of the objects of the present invention is to provide a power means for dogs constructed of relatively movable parts controllable under the power means to initially operate one of the dogs to a work engaging position and thereafter utilize the engaging dog as an anchor to operate the other of said dogs to a work engaging position.

A further object of the invention is the provision of means whereby the upper dog arm is pivotally mounted for spring resisted longitudinal movement with respect to the knee and the power means so connected as to exert a force on the upper dog arm tending to move same in a longitudinal direction following engagement of said dog with the log, whereby the log is drawn toward and held in close contact with the knee while the dog is engaged.

Another object of the present invention is the provision of means whereby the extent of projection of the upper dog beyond the face of the knee may be controlled at will, thus permitting dog engagement with logs, or with cants, or boards, to thereby reduce the liability of the dog projecting into the saw line during the operation of the parts.

Another object of the invention is the mounting of the upper dog arm on a floating fulcrum, which is adapted through power-controlled means to assume one position to cause the upper dog point to move at a maximum distance beyond the face of the knee, as in engaging round logs; or to assume another position to cause the upper dog point to move at a minimum distance beyond the face of the knee, as in engaging cants or boards.

The invention is illustrated in the accompanying drawings, in which:

Fig. 1 is a view in side elevation showing the dogs and operating means therefor, the dogs being shown in withdrawn or normal position.

Fig. 2 is a similar view with the dogs shown in operative position and cooperating with a large log.

Fig. 3 is a view similar to Fig. 2 showing the dogs cooperating with a small log.

Fig. 4 is a view in elevation showing the dogs in operative position and under restricted projection beyond the face of the knee to engage a resaw cant or board.

Fig. 5 is an enlarged end view of the lower dog arm.

Fig. 6 is a vertical section through the same.

Fig. 7 is a side view of a modified form of upper dog arm.

Fig. 8 is a plan view of the same.

Fig. 9 is a sectional view on line 9—9 of Fig. 2.

Fig. 10 is a view in elevation of the operating parts of the structure, the supporting frame and other rigid parts being omitted, the dogs being shown in inoperative or normal position, with the parts in dotted lines arranged to position the dogs to engage a log.

Fig. 11 is a similar view with the dogs in position to engage a large log in full lines, and in position to engage a resaw cant in dotted lines.

Fig. 12 is a perspective view of the dogs, dog-operating means, and supporting frame detached from the knee.

Fig. 13 is a perspective view of the tension link and cooperating angle lever.

Fig. 14 is a side elevation of the knee showing the supporting frame for the mechanism.

In the drawings a head block and knee are conventionally shown at A and B respectively, it being understood that these parts are in any desired or usual form and designed to serve the usual functions in a saw-mill carriage structure.

The dogs and operating mechanism therefor are arranged at one side of the knee, and are supported in proper relation relative to each other and to the knee through an appropriate more or less rigid frame structure which may be briefly described as including an upper frame bar D anchored at its forward end to the upper portion of the knee at 2 and extending rearwardly therefrom in substantial parallelism to the head block.

The rear end of the frame bar D is connected at 12 to one free end of a V-shaped frame bar C, the apex of which is anchored at 1 to a bracket B' secured to the knee, the free end of the other of said arms being anchored to the knee at 11. The frame also includes an additional V-shaped frame bar C', the apex of which extends rearwardly of the frame bar C and the free end of one arm of which is connected at the juncture of frame bars C and D at 12 while the free end of the other arm of such frame C' is anchored to the bracket B' at 1.

Hanger bars H' depend from the pivot pin 12 at the junction of the frame bars described, and the lower dog arm G is pivotally supported at the lower ends of these hanger bars. This dog arm G, as more clearly shown in Figs. 5 and 6, is made up of spaced side plates of substantially right angled triangular formation, each provided at its upper end with an outstanding lateral trunnion 5 for pivotally supporting the lower dog in the hanger bars H'. The spaced side plates are connected on their forward upper edges by a transverse tie plate 28, supported by a brace 29 below said tie plate and between the side plates. The tie plate 28 is provided with blocks relatively inclined on their inner edges 14 to form a seat in which the point M of the lower dog is removably and adjustably secured by U-bolts 9.

An angle lever N including a short arm and a long arm is pivotally supported at the free terminal of the short arm on the pivot pin at 12, and pivotally supported at 3 upon this angle lever at the juncture of its long and short arms is what may be termed a tension link I. The tension link is made up of spaced plates of substantially right angled formation connected as a unit by cross-pieces 32 bridging their rear edges. The angle lever N depends below the pivot pin 3 in a position between the respective plates of the tension link, the lower end of the angle lever extending below the lower end of the link.

The upper dog member comprises a bar-like arm H to the terminal of which the point or dog L is removably secured by a bolt or nut connection 27. Of course the dog points L and M may be made integral with their respective arms but it is preferable to make them detachable for repair or renewal. The mass and therefore the weight of the upper dog arm is materially less than that of the lower dog arm. The rear end of the upper dog arm terminates in a yoke formation having outstanding lateral trunnions 6 which are designed to be pivotally supported in the forward ends of the lower portions of the plates of the tension link I.

The respective upper and lower dogs are moved to and from operative positions by a motor mechanism which is carried by and movable with the dog arms, and as shown comprises a cylinder E with a contained piston and a piston rod F projecting from the piston and beyond the cylinder, fluid pressure, as air or the like, being admitted to opposite sides of the piston through pipe connections 13, controlled of course by a suitable valve or valves, not shown. The cylinder E is swingingly mounted on and with relation to the lower dog arm, the latter for this purpose being provided at substantially the lower rear portion of the spaced plates forming such lower dog arm with a transverse pivot pin 4, on which, through the medium of suitable brackets, the cylinder E is directly mounted. The piston rod F is pivotally connected at its upper end to the upper dog arm H through the medium of a pivot pin 7. It will be apparent that as a result of this construction wherein the pivotal support 6 of the upper dog is mounted on the tension plate 1, carried by the pivoted angle lever N, and the piston rod F is pivotally connected to the upper dog arm at 7, such upper dog arm is mounted on a floating fulcrum, and the upper dog arm pivot will be so identified hereinafter in the specification and claims.

It is important that the upper dog arm be capable of a longitudinal as well as a pivotal movement in order to provide for drawing the log or cant engaged by said upper dog toward the knee when necessary. To permit this result is one function of the floating fulcrum and as it is desirable at the same time to control to some extent the degree of penetration of the upper dog point when engaging the log, the angle lever N is provided with a rod 25 which extends through one of the cross plates 32 uniting the rear edges of the tension link plates. A compression spring J is arranged to encircle the pin 25, one end of the spring bearing on the lower plate 32 and against a washer adjustably secured on the front end of the pin 25 by nuts 26. The spring J exerts pressure upon plate 32 of the tension link I and thus tends to force the upper dog arm H toward the right in Fig. 1 and hold the floating fulcrum 6 of arm H against movement during the first part of the dogging stroke. That end of the angle lever N which projects below the tension link I is connected to the apex of the additional frame C' through the medium of a resilient cushion provided preferably by a cylinder S, containing a piston, with a terminal of the piston rod beyond the cylinder connected to the lower end of the angle lever N at 22, the cylinder being pivotally supported at the apex of the frame bar C' at 21. This cylinder is served by a single supply pipe 23 tending to normally force the piston in a direction to extend the piston rod whereby, as indicated in Fig. 1, the lower end of the angle lever N is held against the stop W on the frame C.

In the normal operation of the parts above described it is designed that the upper dog shall have its maximum projection beyond the face of the knee in order to secure logs of various sizes for the sawing operation.

Obviously, however, in the use of the equipment with resaw cants and the like, the projection of the upper dog beyond the face of the knee must be limited to a distance materially less than that of the normal projection, as otherwise the dog may reach the saw line. Means are provided in the present construction whereby this minimum dog projection can be selectively provided for at will, and to secure this result a guide U is pivotally supported near its lower end at 16 to the knee and is provided at its upper end with a threaded bolt stop 18 designed in the operative position of the guide to engage the pivot pin 12, as indicated in Fig. 4, and thereby permit accurate adjustment of the guide as may be desired. The guide is operated through the medium of a piston and cylinder X pivotally supported at 20 between the lower portions of the upper hook guards K of the knee. This cylinder X, the piston within which is operated through the medium of a fluid supply under pressure through pipes 24, has its piston rod connected at 17 to the guide U, a guide link V being extended beyond the connection between the piston rod and guide U to and on one side of the angle lever N, and connected thereto through the medium of a stud Y operating in a slot in the guide link for a purpose later explained. The guide U which is of bar like construction is formed on the edge remote from the face of the knee with what may be termed a cam like guiding edge with which a roller T carried by the upper dog arm H is designed to cooperate when the guide is functioning as such. The cam edge of the guide U is so defined that when operated to limit the movement of the upper dog through the cooperation of the roller T held thereagainst by spring J and link I, the point of said upper dog will move through an arc to carry the same to the desired limited projection beyond the face of the knee. It will, of course, be apparent that the path of travel of the upper dog point will be controlled by the cam-like guiding edge of the guide U, as the roller T of the upper dog arm rides on this cam edge during the dog movement when the guide is operative. It being desirable that the upper dog point after being projected to the minimum distance beyond the face of the knee shall thereafter move downward in a straight line substantially parallel with the face of the knee, the cam-like edge of the guide is formed to compel this desired dog movement.

When the parts are arranged to restrict the projection of the dogs beyond the face of the knee, as where the guide U is in operative position as illustrated in Fig. 4, it is apparent that if the lower dog is permitted to move an excessive distance it may project into the saw line. This possibility of movement of the lower dog may result from such dog entering a decayed portion of the cant or board, presenting little resistance to the movement of the dog. In order to prevent such possibility of the lower dog movement, the terminal of the lower portion Z of the guide U is adapted when the guide is in operative position, to be arranged in the path of a stop 19 on the lower dog, so that the lower dog in movement is not permitted to move a distance beyond the face of the knee to reach the saw line.

With the parts constructed and arranged as described, the operation is as follows:

Assuming the parts in the positions shown in Fig. 1, where it will be noted that the operative end of the upper dog is rearwardly of the face of the knee and the operative end of the lower dog is below the upper surface of the head block, and the piston in the cylinder E is substantially at its upper limit of movement, it will be apparent that on the admission of fluid pressure to the cylinder E to move the piston downwardly the upper dog arm will be moved on its pivotal supports 6 in a curved path to and beyond the face of the knee, and that the point or dog L of such dog arm will be forced into the log resting on the head block in advance of the knee, as indicated in Figs. 2, 3 and 4. As the fluid pressure continues and the point of the upper dog arm penetrates the log, the upper dog arm is resisted in further downward movement and becomes an anchor, preventing further movement of the piston, so that the further effect of the fluid pressure will be to move the cylinder E in an upward direction. This movement will of course move the lower dog arm upwardly until its dog point M also engages the log, as indicated. It is of course to be understood that as previously stated the weight of the lower dog arm is greater than that of the upper dog arm, so that gravity causes the lower dog to form the anchorage for the initial movement of the parts, insuring therefore that the upper dog will first move to an operative position without any corresponding movement of the lower dog arm until after the upper dog is anchored.

As the upper dog moves to log engaging position it will be apparent that the upper end of the piston rod F, due to the arcuate movement of the upper dog, will move toward the face of the knee, thus inclining the motor as a whole on the pivotal support 4. The continued pressure of the power medium thereafter tends to exert a longitudinal movement on the upper dog arm to draw the point toward the face of the knee, so that if the log is not resting against the face of the knee, such longitudinal movement of the upper dog arm will draw the log into close contact with the knee. This movement is permitted by reason of the pivotal support of the tension link at 3 and is resisted by the spring J. Under these conditions, swinging movement of the angle lever N is prevented through the bearing of pin Y at one end of the slot in guide link V, this construction substantially locking the lever N against the stop W. Therefore, following operative positioning of the upper dog point, said upper dog arm will be moved in a direction to draw the log toward the knee. The spring J also serves to govern the extent of penetration of the point L of the upper dog into the log, for longitudinal movement of the upper dog arm is resisted by the spring, until the resistance to further movement of the penetrating point is sufficient to overcome the tension of the spring. Therefore the spring acts to compel the motive fluid to force the dog point into the log until the resistance to the penetration is sufficient to overcome the tension of the spring J, whereupon the further effect of the power medium is to induce the longitudinal movement of the upper dog arm. Thus by adjustment of the spring J, the penetrative depth of the upper dog point L can be more or less regulated. The effective resistance of the spring is of course dependent upon the holding of the angle lever N in contact with the stop W, through cooperation of stud Y and the stop in the guide link V.

When it is desired to limit the projection of the dogs beyond the face of the knee to the minimum, as when engaging a resaw cant or board, motive fluid is admitted to the cylinder X to project the piston toward the free end of the cylinder, and, through the piston rod, move the guide U on its pivotal support 16 until the terminal of the threaded rod 18 engages the pivot 12, as shown in Fig. 4. In this movement, the guide link V is moved so that stud Y is permitted necessary movement in the slot in the guide link. As the upper dog in its operative movement under these conditions projects beyond the face of the knee to a materially less extent than in its normal operation, it is apparent that the floating fulcrum 6 of the upper dog arm must have been moved inwardly of the face of the knee. To permit this result, as the angle lever N is now free of locking restraint by the guide link V, the motive fluid of the cushion cylinder S through the pipe connection 23, acts so that as the upper dog arm moves downwardly under the motive fluid in cylinder E, to hold the roller T on such upper dog in engagement with and cause it to accurately follow the cam edge of the guide U, thereby compelling the floating fulcrum of the upper dog arm to be bodily moved inwardly of the face of the knee, to thus limit the possible projection of the upper dog point beyond such knee face. This bodily movement of the dog is permitted through the swinging of the angle lever N and the tension link I as a unit on the pivot 12, such swinging being now resisted by the pressure in the cylinder S. Thus the parts will assume the positions indicated in Fig. 4, in which it will be seen that the lateral movement of the pivot 6 of the upper dog and the corresponding swinging of the tension link I, and angle lever N, will cause the point L of the upper dog as controlled by the cam edge of guide U to move down in a comparatively straight line in advance of and substantially parallel to the face of the knee at that minimum distance best adapted to engage a resaw cant or board while materially limiting the liability of the dog point reaching the saw line.

The construction, therefore, provides a dog mechanism in which the respective dogs are operated successively by a fluid pressure motor carried by and movable with the dogs and serving to utilize the dogs successively, first the lower dog and then the upper dog, as an anchor for the action of the power medium on the other of such dogs. Furthermore, this fluid pressure motor also serves as a means for compelling a longitudinal movement of the upper dog arm to draw the log engaged by such upper dog, toward the face of the knee. The construction is also designed to provide for so controlling the movement of the upper dog that it may be given the maximum projection beyond the face of the knee; for engaging logs on the minimum projection beyond the face of the knee; and for engaging resaw cants and boards, there being also provided means for compelling a movement of the upper dog to draw an engaged log toward the face of the knee.

The present construction is important in providing upper and lower dogs operated through a power means arranged between and carried by the dogs; in mounting the upper dog arm on a floating fulcrum and providing power means for governing the position of this floating fulcrum to operate the dog at the maximum or minimum projection beyond the face of the knee at will; and in permitting a spring-resisted power operated movement of the floating fulcrum tending to draw the engaged log or cant close up against the knee.

Obviously, while particular reference has been made herein to fluid pressure motors, such as air cylinders, and such are preferred, it is apparent that other types of fluid pressure motors or electrically operated or even mechanical power means may be as readily employed.

What is claimed is:

1. The combination with a saw mill carriage, of an upper dog therefor, a lower dog therefor, and pressure operated means actuating the dogs including a cylinder connected to one of the dogs, and a piston connected to the other of said dogs.

2. The combination with the knee of a saw mill carriage, an upper dog therefor, a lower dog therefor, and a pressure operated means for actuating the dogs including a cylinder connected to the lower dog and a piston connected to the upper dog, said piston being movable under pressure until the upper dog is arrested in operative position, whereupon the cylinder is moved under the same pressure to actuate the lower dog.

3. A dogging device for the knees of saw mill carriages comprising pivoted upper and lower dogs, a power device arranged between and pivotally connected to the respective dogs, said power device including slidably connected parts adapted for relatively independent movement in opposed directions in response to the progressively increasing action of the power medium, the construction being such that when the slidable parts on being actuated move one of the dogs to operative position, the other of said slidable parts thereafter moves the other dog to an operative position.

4. A dogging device for the knees of saw mill carriages comprising pivotally mounted upper and lower dogs, a fluid pressure motor carried by the dogs and pivotally connected to each, said motor comprising relatively movable parts connected independently to the respective dogs, the movement of one such part in response to fluid pressure actuating one of the dogs to a log engaging position to thereby anchor the said motor part, the other of said motor parts thereafter responding to the fluid pressure to move the other of said dogs to a log engaging position, the operation of the motor parts in positioning the dogs arranging said motor so as to cause the pressure of the motive fluid to exert an endwise pull on one of the dogs following the operation of both dogs to log engaging position.

5. In a dogging device for the knees of saw mill carriages, an upper dog arm mounted on a floating pivot, a pivoted lower dog arm, and a fluid pressure device including a cylinder and a piston interposed between and independently pivoted to the respective dog arms.

6. A dogging device for the knees of saw mill carriages including an upper dog arm, a floating pivotal support therefor, a pivoted lower dog arm, a fluid pressure power device including a cylinder and a piston interposed between and pivotally connected to the respective dog arms, and means for resisting movement of the floating pivotal support of the upper dog arm until the power device has completed the swinging movement of such dog arm, said resisting means then yielding to permit such movement of the floating support as to compel a longitudinal movement of the upper dog arm.

7. In a dogging device for the knees of saw mill carriages, an upper dog arm, a floating pivotal support therefor, yielding means tending to stabilize the pivotal support, a fluid pressure power device for operating the upper dog arm, a lower dog arm pivotally supporting and operated by said power device, the pivotal movement of the upper dog arm in response to the power device serving to position said power device to cause the same to exert pressure on said floating support to compel a longitudinal movement of the upper dog arm following the limit position of its pivotal movement.

8. A dogging device for the knees of saw mill carriages including an upper dog, a floating pivotal support therefor, a pressure means for resisting movement of the support, a pivoted lower dog, a fluid pressure device including relatively movable members pivotally connected to the respective dogs, and a guide controllable to cooperate with the upper dog to limit the projection of said dog beyond the face of the knee, the pressure means for resisting the floating movement of the support in the guided movement of the upper dog permitting corresponding guided movement of the floating support while maintaining its normal pressure against movement of the pivotal support.

9. A dogging device for the knees of saw mill carriages comprising an upper dog, a floating pivotal support therefor, a pivoted angle lever, a fluid pressure means for resisting movement of the angle lever, a bolt and nut carried by said lever, a spring on said bolt between said nut and the floating support to resist movement of the floating support relative to the angle lever, a pivoted lower dog, a fluid pressure power device including relatively movable parts pivotally connected to the respective dogs, a guide for limiting the extent of projection of the upper dog beyond the face of the knee, the fluid pressure means of the angle lever permitting bodily movement of said angle lever and floating support in the guide governed operation of the upper dog without interfering with the spring tension between said angle lever and floating support.

10. In combination with the knee of a saw mill carriage, an upper dog arm, a floating fulcrum for the upper dog arm, a pressure operated power means for the upper dog arm, a releasable locking means for holding the floating fulcrum in position to cause the upper dog arm when operated by the motor to follow one path of movement, a guide for the upper dog arm, a motor for simultaneously positioning the guide and operating the locking means to release the floating fulcrum, and means for exerting pressure on the floating fulcrum to hold the dog arm in cooperation with the guide during the travel of said dog arm in another path of movement following positioning of the guide and the release of the locking means.

11. The combination with the knee of a saw mill carriage, of an upper dog arm, a floating fulcrum therefor, a fluid pressure power means for the dog arm, a member carrying the floating fulcrum, means for resisting movement of the floating fulcrum relative to said member, a guide for the dog, a releasable locking means to hold the said member against movement, a motor operative in one movement to set the guide and release the locking means, and in another movement to set the locking means and move the guide to an inoperative position, and means cooperating with the member to exert pressure upon the floating fulcrum through the member to cause the guiding cooperation between the dog arm and guide when the latter has been set.

12. In combination with a knee of a saw mill carriage having a face, of a mounting supported upon the knee for movement toward and away from the face of the knee, upper and lower dogs mounted relative to the knee, a reversible motor mounted on the knee and operatively connected to the mounting for moving the mounting toward and from the face of the knee to thereby determine the projection of at least one of the dogs to greater or lesser distances forwardly of the knee face, and a motor operating in one direction for actuating the dogs toward each other and reversible for moving the dogs apart, said motor including a part directly operating the upper dog and a second part directly operating the lower dog, said second part being without operating effect on the lower dog until the first mentioned part has compelled a completely operative movement of the upper dog.

13. A saw mill carriage including a knee having a face, a reversible motor carried by the knee, upper and lower log-engaging members operable beyond the face of the knee, a frame mounted on the knee and inter-related with the upper and lower log-engaging members, means connecting the reversible motor to the frame to predetermine a minimum or maximum projection of at least one of the log-engaging members beyond the face of the knee, and a reversible motor mechanism acting in one direction to move the log-engaging members toward each other and in a reverse direction to move the log-engaging members apart, said reversible motor mechanism including a part directly operating one log-engaging member and a second part directly operating the other log-engaging member, said second part being without operating effect on such other log-engaging member until the first mentioned part has compelled a completely operative movement of the log-engaging member operated thereby.

14. The combination with a saw mill carriage, an upper dog therefor, a knee, a lower dog therefor, a reversible motor for actuating the dogs including relatively movable parts, one connected to one of the dogs and the other connected to the other of said dogs, one at least of said dogs being also movable toward and from the face of the knee to establish at least two distinct operative planes in which said dog may be thereafter operated by said reversible motor to engage a log or board, and means controlling the movement of said dog toward and from the face of the knee.

15. In combination with the knee of a saw mill carriage having a face, of a mounting supported on the knee for movement toward and away from the face of the knee, upper and lower dogs mounted relative to the knee, a reversible actuator interconnected between the knee and the mounting for moving the mounting toward and from the face of the knee to thereby determine the projection of at least one of the dogs to greater or lesser distances forward of the knee face and thereby establish at least two distinct operative planes in which said dog may be thereafter operated by said reversible actuator to engage a log or board, a reversible fluid pressure motor interconnected with said dogs and including the usual motor elements, i. e. a cylinder and a piston, at least one of said motor elements being suspended upon one of said dogs, said motor being operable in one direction to force the dogs apart, said motor when operated in the other direction being aided by the weight of the log holding members and by the weight of the element of the motor suspended upon one of the dogs, first to cause the upper log holding members to move downwardly until it engages the log, whereupon the motor lifts the lower log holding member up into engagement with the log and finally drives both members simultaneously into the log.

16. A saw mill carriage including a knee having a face, a reversible actuator, upper and lower log engaging members operable beyond the face of the knee, a frame mounted on the knee and inter-related with the upper and lower log engaging members, means controlled by the reversible actuator and interconnecting the frame and the knee to predetermine a minimum or maximum projection of at least one of the log engaging members beyond the face of the knee, and thereby establish at least two distinct operative planes in which said dog may be thereafter operated by said reversible actuator to engage a log or board, and a reversible motor supported at least in part upon and differentially interconnected between said log engaging members, said motor acting in one direction to move the log engaging members toward each other and in reverse direction to separate the log engaging members from each other, the power of the motor being differentially applied to the log engaging members to operate one of said log engaging members into log engaging position and when arrested by said engagement to thereafter operate the other of said log engaging members into log engaging position through continuous operation of said motor in one direction.

ERVIE A. FERRIS.